(12) United States Patent
Ortenzi et al.

(10) Patent No.: US 9,046,403 B2
(45) Date of Patent: Jun. 2, 2015

(54) SYSTEMS AND METHODS FOR MANAGING USE OF A MEDICAMENT

(75) Inventors: Vernon D. Ortenzi, Burlington, KY (US); Robert J. Ziemba, Cincinnati, OH (US); Simon Alexander Karger, Somerville, MA (US); Brandon Craft, Reisterstown, MD (US); Pari Datta, Cambridge (GB); Andrew Robert Mawby, London (GB); Jeremy Bickerstaffe, Cambridge (GB)

(73) Assignee: MALLINCKRODT LLC, Hazelwood, MO (US)

( * ) Notice: Subject to any disclaimer, the term of this patent is extended or adjusted under 35 U.S.C. 154(b) by 0 days.

(21) Appl. No.: 13/015,480

(22) Filed: Jan. 27, 2011

(65) Prior Publication Data

US 2011/0226817 A1 Sep. 22, 2011

Related U.S. Application Data

(60) Provisional application No. 61/300,183, filed on Feb. 1, 2010.

(51) Int. Cl.
| | |
|---|---|
| *G01D 11/00* | (2006.01) |
| *G01D 13/00* | (2006.01) |
| *G01N 31/22* | (2006.01) |
| *G09F 9/00* | (2006.01) |
| *H01H 9/16* | (2006.01) |
| *G06F 17/00* | (2006.01) |
| *G01F 11/00* | (2006.01) |
| *A61J 1/03* | (2006.01) |
| *A61J 1/14* | (2006.01) |
| *A61J 1/18* | (2006.01) |
| *A61J 7/04* | (2006.01) |
| *G01F 15/06* | (2006.01) |

(52) U.S. Cl.
CPC .............. *G01F 11/006* (2013.01); *A61J 1/03* (2013.01); *A61J 1/1412* (2013.01); *A61J 1/18* (2013.01); *A61J 7/0472* (2013.01); *A61J 2001/1418* (2013.01); *A61J 2001/1425* (2013.01); *A61J 2007/0436* (2013.01); *A61J 2200/30* (2013.01); *G01F 15/063* (2013.01)

(58) Field of Classification Search
None
See application file for complete search history.

(56) References Cited

U.S. PATENT DOCUMENTS

| 4,653,643 | A | | 3/1987 | Black | |
|---|---|---|---|---|---|
| 4,687,423 | A | * | 8/1987 | Maget et al. | ................... 417/379 |
| 4,919,569 | A | | 4/1990 | Wittenzelliner | |

(Continued)

FOREIGN PATENT DOCUMENTS

WO 2005080060 9/2005

OTHER PUBLICATIONS

Definition of "incorporates" as "combined into one body, mass, or substance." Random House Dictinary, 2014.*

*Primary Examiner* — Peter L Ludwig
(74) *Attorney, Agent, or Firm* — Marsh Fischmann & Breyfogle LLP

(57) ABSTRACT

Systems and methods for managing use of a pharmaceutical product are provided. The systems and methods utilize an external cover and a container, along with a first material and a pharmaceutical product that are each contained within an internal space that exists when the external cover is in a closed position relative to the container. Release of the first material may bond the external cover to the container, may result in the first material coming into contact with the pharmaceutical product, or both.

15 Claims, 8 Drawing Sheets

(56) References Cited

U.S. PATENT DOCUMENTS

| | | | |
|---|---|---|---|
| 4,920,912 A * | 5/1990 | Kirkling | 116/308 |
| 5,109,984 A | 5/1992 | Romick | |
| 5,169,388 A * | 12/1992 | McPhee | 604/90 |
| 5,277,325 A * | 1/1994 | Yan | 215/206 |
| 5,313,439 A * | 5/1994 | Albeck | 368/10 |
| 5,334,178 A * | 8/1994 | Haber et al. | 604/415 |
| 5,385,269 A * | 1/1995 | Richter et al. | 222/105 |
| 5,401,444 A | 3/1995 | Spinello | |
| 5,525,299 A | 6/1996 | Lowe | |
| 5,860,419 A * | 1/1999 | Davies et al. | 128/203.15 |
| 6,010,444 A | 1/2000 | Honeycutt et al. | |
| 6,087,548 A | 7/2000 | Levy et al. | |
| 6,158,613 A * | 12/2000 | Novosel et al. | 221/3 |
| 6,267,265 B1 * | 7/2001 | Issa | 221/288 |
| 6,373,786 B1 * | 4/2002 | Kagan et al. | 368/10 |
| 6,601,729 B1 * | 8/2003 | Papp | 221/25 |
| 7,081,807 B2 * | 7/2006 | Lai | 340/309.7 |
| 7,249,687 B2 * | 7/2007 | Anderson | 221/5 |
| 7,392,918 B2 * | 7/2008 | Holloway et al. | 221/151 |
| 7,408,843 B2 * | 8/2008 | Brandon | 368/10 |
| 7,416,540 B2 * | 8/2008 | Edwards et al. | 604/144 |
| 7,559,321 B2 * | 7/2009 | Wermeling et al. | 128/200.14 |
| 7,615,271 B2 | 11/2009 | Hetzler et al. | |
| 7,838,715 B2 * | 11/2010 | Uhland et al. | 588/313 |
| 7,867,511 B2 | 1/2011 | Anderson et al. | |
| 7,931,022 B2 * | 4/2011 | Johnson et al. | 128/203.15 |
| 8,221,705 B2 * | 7/2012 | Breidenthal et al. | 422/552 |
| 8,236,238 B2 * | 8/2012 | Uhland et al. | 422/22 |
| 8,490,795 B2 | 7/2013 | Ziemba | |
| 2004/0106914 A1 * | 6/2004 | Coppeta et al. | 604/892.1 |
| 2005/0252511 A1 * | 11/2005 | Pentafragas | 128/203.15 |
| 2005/0258066 A1 * | 11/2005 | Conley | 206/538 |
| 2006/0037663 A1 * | 2/2006 | Haimi | 141/65 |
| 2007/0194890 A1 * | 8/2007 | Brue | 340/309.16 |
| 2007/0258048 A1 * | 11/2007 | Pitchers | 353/26 R |
| 2008/0173666 A1 * | 7/2008 | Coe et al. | 221/265 |
| 2009/0180936 A1 * | 7/2009 | Anderson et al. | 422/129 |
| 2009/0234331 A1 * | 9/2009 | Langereis et al. | 604/891.1 |
| 2010/0185143 A1 * | 7/2010 | Uhland et al. | 604/67 |
| 2010/0326020 A1 * | 12/2010 | Schmaelzle et al. | 53/471 |
| 2011/0012742 A1 * | 1/2011 | Johnson | 340/669 |
| 2011/0060457 A1 * | 3/2011 | De Vrught et al. | 700/241 |
| 2011/0132795 A1 | 6/2011 | Silverman | |
| 2011/0272428 A1 | 11/2011 | Ziemba et al. | |
| 2012/0223091 A1 * | 9/2012 | Bond et al. | 221/7 |

* cited by examiner

SYSTEMS AND METHODS FOR MANAGING USE OF A MEDICAMENT

CROSS REFERENCE TO RELATED APPLICATIONS

This patent application claims priority to U.S. Provisional Patent Application Ser. No. 61/300,183, filed Feb. 1, 2010, entitled "SYSTEMS AND METHODS FOR MANAGING USE OF A MEDICAMENT," and the entire disclosure of which is hereby incorporated by reference in its entirety herein.

FIELD OF THE INVENTION

The present invention is generally directed to managing the use of and/or access to a pharmaceutical product, including for instance reducing the potential that a pharmaceutical product will be accessed or used past the prescription period.

BACKGROUND

Serious public health issues arise due to the abuse, misuse, diversion, and overdose of medications that remain at the end of a course of treatment. For instance, the abuse, misuse, diversion and overdose of opioid-based analgesics pose particularly pertinent public health issues given the effects and susceptibility of abuse of opioid-based analgesics. It is often the case that after a course of treatment, or as a result of the patient not completing the full treatment, there may be excess medication remaining that should be disposed of.

In many instances, individuals simply retain the medication. Oftentimes these medications are stored with other pharmaceutical products or the like. Alternatively, the medication may simply be placed in the trash or some other non-secure disposal means. In either instance, access to the medication remains, such that the medication may be abused, misused, stolen, sold, or otherwise mishandled. Unauthorized access to these improperly disposed of medications by individuals without a prescription may lead to abuse, allergic reaction, or even death.

In some instances, take back programs have been instituted that allow users to request shipping materials in order to ship used or unused medication to a certified disposal company. These programs tend to be costly and require actions by the patient at multiple times. However, in many instances remaining medication is simply disposed of in an insecure or unsafe manner such as, for instance, by being flushed down a toilet, by being thrown in the trash, or by being retained in a medicine cabinet or other location in a person's home.

SUMMARY

The present invention may be characterized as relating to systems and methods for managing the use of and/or access to a pharmaceutical product, for instance a pharmaceutical product that remains after a certain period of time. The present invention may also be characterized as relating to systems and methods for facilitating the disposal of pharmaceutical product. In any case, the present invention may utilize a release mechanism for a confined first material that manages the use of and/or access to a pharmaceutical product, that facilitates disposal of a pharmaceutical product container having pharmaceutical product contained therein, or both. The released first material (i.e., released from the confined state) may bond or fix an external cover to a container/container body (e.g., to fixedly seal the pharmaceutical product container, for instance by bonding a cover to a container or container body), may come into contact with remaining pharmaceutical product within the pharmaceutical product container (e.g., to encapsulate the pharmaceutical product; to bond the pharmaceutical product to the interior of the container), or any combination thereof.

A first aspect of the present invention is embodied by what may be characterized as a pharmaceutical product supply. The pharmaceutical product supply includes a container that has an opening, along with an external cover (e.g., a lid) that is detachably engaged with the container and blocks this opening. An internal space exists when the external cover is detachably engaged with the container. Both a pharmaceutical product and a first material are located within this internal space (e.g., at different locations within this internal space; separated from each other within this internal space). There is a release mechanism associated with the first material. This release mechanism may be incorporated by the container, by the external cover, or both.

A second aspect of the present invention is directed to a pharmaceutical product container cover or lid (e.g., for use in combination with a pharmaceutical product container). The pharmaceutical product container lid includes a connector for detachably engaging the pharmaceutical product container lid with an appropriate pharmaceutical product container (e.g., an end portion of a pharmaceutical product container having an opening through which pharmaceutical product may be accessed). A first material is incorporated by the pharmaceutical product container lid, and there is an associated release mechanism for this first material (i.e., the release mechanism is incorporated by the pharmaceutical product container lid).

A number of feature refinements and additional features are separately applicable to the first and second aspects of the present invention. These feature refinements and additional features may be used individually or in any combination. As such, each of the following features that will be discussed may be, but are not required to be, used with any other feature or combination of features of the first and second aspects. The following discussion is separately applicable to each of the first and second aspects, up to the start of the discussion of a third aspect of the present invention.

A pharmaceutical product container or container body of any appropriate size, shape, configuration and/or type may be utilized. Any appropriate way of detachably interconnecting an external cover with any such pharmaceutical product container may be utilized (e.g., so that the external cover is completely removable from the pharmaceutical product container, for instance using a threaded connection, a snap-fit, a press-fit, or the like; so that the cover is movable between open and closed positions while remaining interconnected with the container in some fashion, for instance by having the external cover be pivotally connected with a pharmaceutical product container). The external cover may be characterized as being secured to the container when detachably engaged with the container. A resistive force may maintain the external cover and the container in a coupled or secured state when the external cover is in a closed position. For instance, the detachable engagement between the external cover and the container may provide at least some resistance to relative motion between the external cover and container along an axis about which a sidewall of the container is disposed (e.g., a resistance to pulling the external cover off the container). This resistance may be overcome to move the external cover from its closed position to its open position.

In one embodiment, there may be an interlock between the external cover and the container when the external cover is in a closed position (e.g., to enclose pharmaceutical product within the container). Any appropriate interlock may be utilized, such as the above-noted threaded connection, snap-lock connection, or press-fit connection between the cover and container. When the external cover and container are disposed in interlocking relation, the external cover should remain secured to the container, even if the container is disposed in an upside down position or orientation. In this regard, the interlock may be characterized as providing at least some resistance for maintaining the external cover in a closed position (e.g., the interlock may constrain or limit relative movement between the container and external cover to at least some degree, where this relative movement would tend to move the external cover to an open position).

The first material may be integrated with the external cover and/or container in any appropriate manner. The first material could be appropriately attached (e.g., bonded) to an interior surface ("interior" being in relation to when the external cover is detachably engaged with an associated pharmaceutical product container; when the external cover is in a closed position) of the external cover, an associated container, or both. The external cover and/or container may utilize a separate containment (e.g., a "bladder," for instance in the form of an autonomous structure in relation to the associated external cover and/or container) for containing the first material. This containment may be characterized as itself defining an enclosed space for accommodating receipt of the first material, and which may isolate the first material from the pharmaceutical product within the container until release of the first material is desired. In one embodiment, the containment is pressurized. For instance, the internal pressure within the containment may be greater than the pressure in the space in which the pharmaceutical product is stored. Activation of the release mechanism may be characterized as opening the containment in at least some respect (e.g., creating at least one opening) so as to release the first material, such as by puncturing the containment, rupturing the containment, bursting the containment, removing at least a portion of the containment, disintegrating at least a portion of the containment, or any combination thereof.

The external cover and/or associated container may include one or more seals. Each such seal may be characterized as isolating the first material from the pharmaceutical product until activation of the release mechanism, as maintaining the first material in a confined state or condition until activation of the release mechanism, as blocking communication between the first material and the pharmaceutical product until activation of the release mechanism, or any combination thereof. For instance, the external cover and/or associated pharmaceutical product container may include a pocket or receptacle (with or without a separate containment disposed therein), and one or more seals may be associated with this receptacle (e.g., to isolate this receptacle from the portion of the internal space occupied by the pharmaceutical product). Any such seal may be of any appropriate size, shape, configuration, and/or type (e.g., a membrane, a disk).

The release mechanism may be operative to interact with the above-noted seal(s). In one embodiment, this seal(s) isolates the first material from the portion of the internal space that is occupied by the pharmaceutical product. The seal(s) could be part of the external cover. In this regard, the seal(s) may be made of the same material from which the external cover is constructed or may be a different material. For instance, the seal(s) may be integrally formed with the external cover and define a portion of the external cover having a reduced dimension (e.g., a given seal may be defined by scoring). Thus, in one embodiment, the seal(s) may form a weakened portion of the external cover that is more susceptible to rupture or puncture than remaining portions of the external cover. However, the seal(s) could also be a separate structure of any appropriate size, shape, configuration, and/or type (e.g., a membrane, a disk). In any case, the release mechanism may interact with the seal(s) such that the seal(s) is disabled or opened in at least some fashion, such as where at least part of one or more of the seals is removed, punctured, bursts, disintegrates, cut, torn, popped, melted, opened, broken, ruptured, or any combination thereof.

The first material may be contained within an appropriate containment as noted (e.g., in the form of an autonomous structure in relation to the associated external cover and/or container, for instance a bladder or the like). Any such containment may be incorporated in any appropriate manner. In one embodiment, the release mechanism interacts with the containment to puncture, burst, remove a portion of, or otherwise open the containment in at least some respect, to thereby release the first material from the containment. In one embodiment, the first material is contained within a containment, or is otherwise sealed off from the portion of the internal space occupied by the pharmaceutical product, at a pressure greater than a pressure outside of the containment and/or on the opposite side of the seal(s) (e.g., the pressure within the containment, and/or on the "first material side" of the seal(s), may be greater than a pressure within the portion of the internal space occupied by the pharmaceutical product). A pressure differential therefore may facilitate a discharge of the first material from the containment and/or through a disabled or opened seal(s) upon activation of the release mechanism. In various embodiments, the first material may be a material such as an emetic, a taste deterrent, an adhesive, an epoxy, an olfactory repellent, a drug antagonist, another appropriate material, or any combination thereof.

In an embodiment, the external cover may be in the form of an external container lid. The container and/or external cover may incorporate standard features of a pharmaceutical product container. For instance, the container and/or external cover may be sized according to standard dimensions and incorporate standard child-proofing and/or tamper-resistant features. In one arrangement, the external cover may be rotatably attachable/detachable to the container via respective threaded features on the external cover and the container, and in this regard may be selectively attachable/detachable to the container. Alternative detachable/attachable external covers may be provided, such as snap-fit connections, interference connections, or other appropriate connections. In an embodiment, the external cover may be pivotally interconnected to the container body. As an example, any appropriate hinge (e.g., living hinge) may pivotally interconnect the external cover to the container to allow the external cover to pivot between at least open and closed positions. In some arrangements, the external cover may be both pivotally and rotatably attachable to the container. For instance, the external cover may be threadably connectable to the container (e.g., rotatably connected) and also be pivotally connectable to the container via any appropriate resilient member (e.g., a thin resilient piece of plastic). In an embodiment, movement of the external cover relative to the container exposes and/or provides access to the pharmaceutical product. In one arrangement, the external cover may be removed entirely from the container to expose the pharmaceutical product contained therein.

Activation of the release mechanism may be characterized as releasing the first material from a confined state or condition. One or more signals of any appropriate type may be transmitted to the release mechanism in any appropriate manner to activate the same. Representative signals for triggering the release mechanism include a mechanical signal (e.g., transmission of a force; moving one or more components to activate the release mechanism), an electrical signal, an optical signal, an electromagnetic signal, a magnetic signal, an RF signal, or any combination thereof.

In an embodiment, the release mechanism may be mechanically triggered. For example, the release mechanism may include one or more buttons, springs, linkages, levers, or any other appropriate mechanism or combination of mechanisms. Alternatively, in an embodiment, the release mechanism may be electro-mechanically triggered. For example, the release mechanism may include actuators, solenoids, electro-mechanical valves, or other appropriate electro-mechanical apparatus. Additionally, the release mechanism may be triggered independent of any attachment or detachment of the external cover to a pharmaceutical product container. In this regard, the release mechanism may be triggered without movement of the external cover associated with attachment or detachment of the external cover with respect to a pharmaceutical product container.

In one embodiment, the release mechanism may be activatable in response to a timer. The timer may be pre-set and/or programmable (e.g., by a physician, pharmacist, patient, or other appropriate individual). The programming of the timer may be by way of a physical connection (e.g., when a pharmaceutical product container is docked at a base station or the like), a wireless connection, or via any appropriate communication link. Multiple programming events may occur for the same external cover such that the timer is modified after having been set. For instance, a physician may be able to modify a timer based on patient discussions or a change in treatment. The timer may correspond to an allowable prescription period.

The release mechanism may be manually activatable. A manual force may be exerted on any appropriate structure and may be transmitted through any appropriate mechanical arrangement to release the first material from a confined state or condition. For instance, manual activation may include action on the part of an individual (e.g., by a physician, pharmacist, patient, or other appropriate individual). The release mechanism may be manually activatable on an exterior of the pharmaceutical product supply. A separate and openable cap (e.g., accessible on an exterior of the external cover or container) may be provided for the release mechanism, for instance to reduce the potential that it will be inadvertently activated by exertion of a force thereon.

The release mechanism may be activatable in response to a wireless signal. The wireless signal may include a communication such as a network communication, an e-mail, a text message, a phone call, or any other appropriate communication. The release mechanism may be activatable in response to a predetermined event. The predetermined event may include exceeding a predetermined number of detachments of the external cover from the pharmaceutical product container in a predetermined time period, may be a time period elapsing without the occurrence of a predetermined number of detachments of the external cover from the pharmaceutical product container, or both. The noted "detachments" may be characterized as a movement of the external cover to an open position.

In one embodiment, the release mechanism may be operable to release the first material to lock the cover to the container (e.g., by bonding the external cover to the associated pharmaceutical product container; by fixing the external cover to the associated pharmaceutical product container). Accordingly, the released first material may contact the external cover and an adjacent portion of the container. In another embodiment, the release mechanism may be operable to release the first material so that the first material contacts the pharmaceutical product. The first material may at least substantially encapsulate the pharmaceutical product, may bond the pharmaceutical product to the container, or both. The first material may be isolated from the pharmaceutical product in a first condition (e.g., prior to activation of the release mechanism), and the first material may be in contact with the pharmaceutical product in a second condition (e.g., after activation of the release mechanism).

Another embodiment may include a sensor operative to determine if the external cover is engaged with an associated pharmaceutical product container (e.g., to determine if the external cover is in a closed position). Accordingly, the release mechanism may be activatable when the external cover is engaged with an associated pharmaceutical product container (e.g., when the external cover is in a closed position), and may be not activatable when the external cover is not engaged with an associated pharmaceutical product container (e.g., when the cover is in an open position). The sensor may also provide other features based on the engagement of the external cover and container such as initiating a timer, or monitoring the number of times the container has been accessed.

Yet another embodiment may include an alert indicative of a remaining time period prior to activation of the release mechanism. The alert may communicate a quantitative value, such as remaining days, hours, or minutes remaining until activation of the release mechanism. For instance, the alert may be a numerical LCD display. In an embodiment, the alert may be an auditory signal that sounds when a certain time is left before activation of the release mechanism. The auditory signal may be repeated until activation of the release mechanism, or additional tones or sounds may be produced to indicate a remaining time.

Another embodiment may include a pharmaceutical product supply system having a remotely located trigger. The release mechanism may be activatable in response to the remotely located trigger. The remotely located trigger may be activatable by a physician or may be activatable by a patient.

One embodiment of a pharmaceutical product supply system may include a plurality of selectable external covers that are detachably engageable with the container to block an opening through which pharmaceutical product may be accessed (e.g., when the external cover is in a closed position). Each selectable external cover may include a first material, a release mechanism, or both. In this embodiment, a first group of the plurality of selectable external covers may be associated with a first timed release of the first material and a second group of the plurality of external covers may be associated with a second timed release of the first material that is different from the first timed release. The external cover may be selected from the plurality of selectable external covers. The first group of the plurality of external covers may bear corresponding first indicia that may be indicative of the first timed release. The second group of the plurality of external covers may bear corresponding second indicia that may be indicative of the second timed release. The first indicia and the second indicia may be visible on the exterior of the pharmaceutical product supply system (e.g., on an exterior of the external cover and/or container). Any appropriate number of cover groups may be utilized, each cover group having a different timed release.

A third aspect of the present invention is directed to a method for managing the use of a pharmaceutical product. The method includes uncoupling an external cover from a container. This may entail moving the external cover to an open position to expose an opening of the container (e.g., an open end of a typical "pill bottle"). Pharmaceutical product may be removed from the container (and/or introduced into the container) through the opening that was uncovered by the noted uncoupling. The external cover may also be coupled to the container. This may entail moving the external cover to a closed position. Both the pharmaceutical product and a first material are disposed within an enclosed space defined by coupling the external cover with the container. However, the first material is isolated from the pharmaceutical product when in a confined state or condition, including when within the noted enclosed space. A release mechanism may be activated when the external cover is in its closed position to release the first material from its confined state. The usability of the pharmaceutical product (e.g., the ability for the pharmaceutical product to be utilized in an approved or prescribed manner) is changed from a first state or condition to a second state or condition by this release of the first material.

A number of feature refinements and additional features are applicable to the third aspect of the present invention. These feature refinements and additional features may be used individually or in any combination. The following discussion is applicable to at least the third aspect.

The term "coupling" means the establishment of some type of connection between the external cover and container that is something more than mere contact. Exemplary couplings include without limitation threading the external cover onto the container, press-fitting the external cover onto the container, snap-fitting the external cover to the container, providing a rotatably-controlled locking arrangement (e.g., mating locking tabs that are engaged/disengaged by rotating the external cover relative to the container), and the like. A resistive force may maintain the external cover and the container in a coupled or secured state when the external cover is in a closed position. A coupled or secured state between the external cover and container may be characterized as providing at least some resistance to relative motion between the external cover and container along an axis about which a sidewall of the container is disposed (e.g., a resistance to pulling the external cover off the container). This resistance may be overcome to move the cover from a closed position to an open position.

Coupling the external cover with the container when the external cover is in a closed position (e.g., to enclose pharmaceutical product within the container) may entail interlocking the external cover with the container. Any appropriate interlock may be utilized, such as the above-noted threaded connection, snap-lock connection, or press-fit connection between the cover and container. When the external cover and container are disposed in interlocking relation, the external cover should remain secured to the container, even if the container is disposed in an upside down position or orientation. In this regard, the interlock may be characterized as providing at least some resistance for maintaining the external cover in a closed position (e.g., the interlock may constrain or limit relative movement between the container and external cover to at least some degree, where this relative movement would tend to move the external cover to an open position).

Activation of the release mechanism may entail sending one or more signals to the release mechanism. A signal of any appropriate type may be transmitted to the release mechanism in any appropriate manner to activate the same. Representative signals for triggering the release mechanism include a mechanical signal (e.g., transmission of a force; moving one or more components to activate the release mechanism), an electrical signal, an optical signal, an electromagnetic signal, a magnetic signal, an RF signal, or any combination thereof.

The activating step may occur locally. The activating step may occur remotely. The activating step may involve manually activating the release mechanism (e.g., through exertion of an external force). One embodiment may involve the activating step being responsive to a timer. Such a timer may be pre-set. The timer may also be programmable. The timer may correspond to an allowable prescription period for the pharmaceutical product.

In an embodiment, the activating step may be responsive to a wireless signal. Alternatively or additionally, the activating step may be responsive to a predetermined event. For instance, the predetermined event may include exceeding a predetermined number of detachments of the external cover from the container (e.g., a movement of the external cover to an open position) over a predetermined time period (e.g., to determine when the pharmaceutical product has been accessed "too often"), may include a predetermined number of detachments of the external cover from the container not occurring during a predetermined time period (e.g., to determine when the pharmaceutical product has been accessed "too infrequently"), or both.

In one embodiment, the releasing step may include mechanical operation of the release mechanism. Alternatively, the releasing step may include electro-mechanical operation of the release mechanism. The releasing step may include interacting with one or more seals that initially provide isolation between the first material and the pharmaceutical product. The releasing step may include opening a containment incorporating the first material (e.g., a separate bladder or the like) in at least some respect (e.g., rupturing, piercing, puncturing, ripping). The releasing step may also be independent of the uncoupling or coupling of the external cover with respect to the container. As such, the releasing step may be carried out separately from the uncoupling or coupling steps.

In various embodiments, the first material may include a material such as an emetic, a taste deterrent, an adhesive, an epoxy, an olfactory repellent, a drug antagonist, or a combination thereof. As noted in relation to the third aspect, the usability of the pharmaceutical product changes from a first state or condition to a second state or condition by a release of the first material. The first condition may be where the pharmaceutical product may be accessed through the external cover (e.g., through movement of the external cover to an open position) and is in its prescribed form. Various second conditions are envisioned. The second condition may be locking or bonding of the external cover to the container using the released first material. The second condition may be contacting the pharmaceutical product with the released first material. For instance, the second condition may be the encapsulation of the pharmaceutical product by the released first material. The second condition may be the first material coming into contact with the pharmaceutical product without encapsulating the same (e.g., to coat the pharmaceutical product), for instance, to make the pharmaceutical product have a bad taste, to induce vomiting if the contacted pharmaceutical product is ingested, to neutralize the pharmaceutical product, to render the pharmaceutical product inactive, to alter the pharmaceutical product in one or more respects (e.g., cause a fluid pharmaceutical product to transition to an unusable, solid block), or any combination thereof. The second condition may entail both locking or bonding the external cover to the container using the released first material, as well as having the released first material come into contact with the pharmaceutical product.

One embodiment may include selecting the external cover from a plurality of external covers. The external covers may include the release mechanism, the first material, or both. In another embodiment, the selecting step is at least partially based on a timed release associated with the external cover. The plurality of external covers may include a plurality of groups of external covers—each group of the plurality of groups may be associated with a timed release period different than other groups of the plurality of groups.

Another embodiment may include determining if an external cover is engaged with a container (e.g., if the external cover is in a closed position). The activation of the release mechanism may occur if the external cover is coupled with the container (e.g., if the external cover is in a closed position); however, activation of the release mechanism may be unavailable if the external cover is not coupled with the container (e.g., if the external cover is not in a closed position).

A number of feature refinements and additional features are separately applicable to each of above-noted first, second, and third aspects of the present invention. These feature refinements and additional features may be used individually or in any combination in relation to each of the above-noted first, second, and third aspects of the present invention. Initially, each feature discussed in relation to any aspect may be utilized by each other aspect unless otherwise noted herein.

The container may be of any appropriate size, shape, configuration, and/or type. For instance, the container may be a standard pill bottle. In alternative embodiments, the container may be a vial, cartridge, blister package, or other pharmaceutical product storing apparatus. The interior may be appropriately sized to contain, hold and/or store one or more pharmaceutical products. The interior may be accessed by way of the opening of the container (e.g., moving the external cover to an open position). In this regard, the external cover may be moved relative to a remainder of the container to gain access to the interior (e.g., by exposing the opening). Additionally, the external cover may block the opening (e.g., when the external cover is in a closed position), substantially isolating the pharmaceutical product within the interior. In other words, the external cover may be used for selectively allowing or providing access to the interior (e.g., to add and/or remove a pharmaceutical product).

A "pharmaceutical product" as used herein may generally define any material or substance used in the course of a medical treatment, medical diagnosis, therapy, or the provision of any other appropriate medical care. A given material need not contain an active drug compound or ingredient to be considered a "pharmaceutical product" for purposes of the present invention.

A pharmaceutical product within a container may be in any appropriate form, in any appropriate dose, and of any appropriate type. A pharmaceutical product encompasses both a single-dose configuration (e.g., a single pill) and a multiple dose configuration (e.g., a plurality of pills). Pharmaceutical product may be in any appropriate form such as (but not limited to) pills, tablets, chewables, capsules, powders, fluids (e.g., liquids, suspensions, emulsions), patches (e.g., transdermal patches), films (e.g., transmucosal or buccal), strips (e.g., transmucosal or buccal), or the like. Further, a "pharmaceutical product" may refer to or include any "drug" as defined in Title 21 of the United States Code, Section 321(g)(1).

All pharmaceutical product within the container may be of at least substantially common dose. Alternatively, some pharmaceutical product could be of one dose (e.g., a prescribed dose), while some pharmaceutical product could be of a different dose (e.g., in the form of a transdermal patch that has been used by a patient, such that at least part of its original dosage has already been transdermally administered to a patient). All pharmaceutical product within the container could be in a common first condition. For instance and in the case of transdermal patches, all transdermal patches within the container could be contained within individual primary packaging (e.g., within a sealed pouch, jacket, foil wrapping, or the like), or all transdermal patches within the container could be in an exposed state (e.g., where the individual transdermal patches have been removed from their associated primary packaging before being disposed within the container). Some pharmaceutical product within the container could be in a common first condition, such as contained within individual primary packaging (e.g., within a sealed pouch, jacket, foil wrapping, or the like), while some pharmaceutical product within the container could be in a common second condition (e.g., in an exposed state or where the individual transdermal patches have been removed from their associated primary packaging before being disposed within the container).

Any transdermal patches utilized with the present invention may include any appropriate pharmaceutical product. Examples of appropriate pharmaceutical products that may be included in such transdermal patches include (but are not limited to): U.S. Drug Enforcement Administration (DEA) scheduled (e.g., Schedule II) drugs such as fentanyl, lidocaine, tetracaine, prilocalne, thebaine, buprenorphine, sufentanil, alfentanil, codeine, dihydrocodeine, hydrocodone, hydromorphone, levorphanol, methadone, morphine, nalbuphine, noscapine, opium, oxycodone, and propoxyphene; non-steroidal anti-inflammatory drugs (NSAIDs) such as ketoprofen, diclofenac, flurbiprofen, and ibuprofen; steroids such as testosterone and estradiol; psychoactive drugs such as buspirone; vitamins such as vitamin B12; vasodilators such as nitroglycerin; vaccines; antiemetics; capsaicin; and nicotine. Further, any transdermal patches utilized with the present invention can function to provide drug delivery in any appropriate manner. For instance, such transdermal patches may include those functioning via a passive delivery mechanism (e.g., pharmaceutical product located within the adhesive of the patch, within a reservoir of the patch, within a semisolid matrix (e.g., a gel)) or via an active delivery mechanism (e.g., iontophoresis, sonophoresis, electroporation, microneedles, abrasion, needle-less injection, suction, stretching, magnetophoresis, radio frequency, lasers, photomechanical waves, temperature (e.g., heat-activation)).

Any of the embodiments, arrangements, or the like discussed herein may be used (either alone or in combination with other embodiments, arrangement, or the like) with any of the disclosed aspects. Any feature disclosed herein that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular (e.g., indicating that a cover includes "a receptacle" alone does not mean that the cover includes only a single receptacle). Moreover, any failure to use phrases such as "at least one" also does not limit the corresponding feature to the singular (e.g., indicating that a cover includes "a receptacle" alone does not mean that the cover includes only a single receptacle). Use of the phrase "at least generally," "at least partially," or the like in relation to a particular feature encompasses the corresponding characteristic and insubstantial variations thereof. Finally, a reference of a feature in conjunc-

DETAILED DESCRIPTION

Various embodiments of pharmaceutical product or pharmaceutical product containers will be described in relation to the accompanying figures. A pharmaceutical product container with pharmaceutical product therein may be referred to as a "pharmaceutical product supply." In any case, these pharmaceutical product containers are configured to store "pharmaceutical product" as described herein (e.g., in any appropriate form, in any appropriate dose, and of any appropriate type), and furthermore include one or more features to facilitate the management of the use of the pharmaceutical product, including facilitating the disposal of unused pharmaceutical product. In this regard, each of the following embodiments includes a release mechanism for a material that changes the usability of the pharmaceutical product from a first state or condition to a second state or condition, including facilitating the disposal of a pharmaceutical product container having pharmaceutical product contained therein. By way of initial summary, the released material (e.g., released from a confined state or condition) may bond or fix a cover to a container body (e.g. to fixedly seal the pharmaceutical product container, for instance by bonding a cover to a container or container body), may come into contact with remaining pharmaceutical product within the pharmaceutical product container (e.g., to encapsulate the pharmaceutical product; to coat the pharmaceutical product with a substance which should reduce the potential that the pharmaceutical product will thereafter be orally administered), or both.

Figure 1:
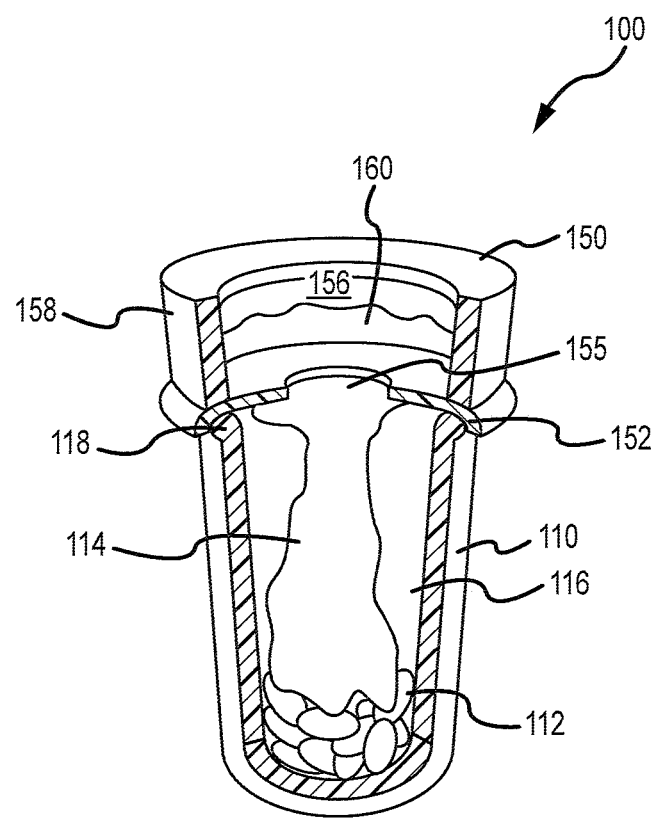
FIG. 1 is a cutaway perspective view of one embodiment of a pharmaceutical product supply.
Figure 2:
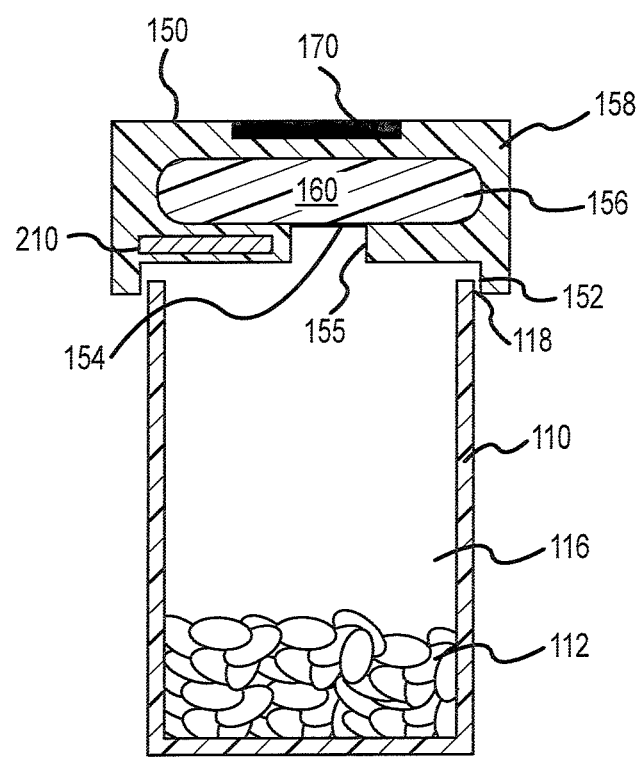
FIG. 2 is a cross-sectional view of the pharmaceutical product supply of FIG. 1.

FIGS. 1 and 2 show one embodiment of a pharmaceutical product supply 100 in accordance with the foregoing and that stores a pharmaceutical product 112. The pharmaceutical product supply 100 generally may be comprised of a container 110 and an external cover 150. The container 110 may be of any appropriate size, shape, configuration and/or type and, for instance, may be a common type of container structure for storing a pharmaceutical product. For example, the container 110 may comprise a standard pill bottle or standard vial for storing a pharmaceutical product. Similarly, the external cover 150 may incorporate common features of a lid for a pharmaceutical product container. This may include an external cover 150 comprising standard dimensions and standard safety features, such as a childproof design or the like.

The external cover 150 may include a connector 152 that is engageable with the container 110 (e.g., an end of the container 110 having an opening 118). In this regard, the external cover 150 may be selectively detachably engaged with the container 110 at or in proximity to the opening 118 (e.g., to block the same). "Detachably engaged" means that the external cover 150 is at least partially removable from the container 110 without damaging the external cover 150, the container 110, or any "joint" therebetween, such that the external cover 150 may be reattached to the container 110. The illustrated external cover 150 is detachably engaged with the container 110 by being completely removable therefrom. Other configurations may also allow the external cover 150 to be moved relative to the container 110 between open and closed positions, and yet still retain a physical interconnection in each such instance (e.g., where an external cover is pivotally interconnected with a container—not shown). Generally, the external cover 150 should be movable relative to the container 110 between at least open and closed positions, where in the open position the interior 116 of the container 110 is accessible (e.g., through the opening 118), and where in the closed position the interior 116 of the container 110 is "closed off" by the external cover 150 (e.g., where the opening 118 is blocked by the external cover 150; to define an enclosed space). In the closed position, the cover 150 may be attached, secured, or coupled to the container 110 in at least some respect. A resistive force may maintain the cover 150 and the container 110 in a coupled state when the cover 150 is in a closed position. For instance, the detachable engagement between the cover 150 and the container 110 may provide at least some resistance to relative motion between the cover 150 and container 110 along an axis about which a sidewall of the container 110 is disposed (e.g., a resistance to pulling the cover 150 off the container 110). This resistance may be overcome to move the cover 150 from it closed position to its open position.

In one embodiment, there may be an interlock between the external cover 150 and the container 110 when the external cover 150 is in a closed position (e.g., to enclose pharmaceutical product 112 within the container 110). Any appropriate interlock may be utilized, such as a threaded connection, snap-lock connection, or press-fit connection between the external cover 150 and container 110. When the external cover 150 and container 110 are disposed in interlocking relation, the external cover 150 should remain secured to the container 110, even if the container 110 is disposed in an upside down position or orientation. In this regard, the interlock may be characterized as providing at least some resistance for maintaining the external cover 150 in a closed position (e.g., the interlock may constrain or limit relative movement between the container 110 and external cover 150 to at least some degree, where this relative movement would tend to move the external cover 150 to an open position).

When the external cover 150 is engaged with the container 110 (e.g., in a closed position), a pharmaceutical product 112 may be contained by the supply 100 within an interior 116. The interior 116 may be defined at least by the external cover 150 and container 110 in an assembled state. In this regard, pharmaceutical product 112 located in the interior 116 may be substantially isolated from an environment exterior to the container 110 and external cover 150. The external cover 150 may be detachably engaged with the container 110 such that the external cover 150 may be repetitively engaged and disengaged without damaging either the external cover 150 or the container 110 (e.g., so that pharmaceutical product 112 may be accessed and removed from the interior 116 through the opening 118). The connector 152 and an end of the container 110 having the opening 118 may be in the form of a threaded connection, a snap-fit connection, an interference connection, a press-fit connection, or any other type of appropriate detachably engageable connection known in the art.

The external cover 150 may also include a pocket or receptacle (e.g., an open space or cavity) and/or a containment (e.g., a structure, such as a bladder) 156. The receptacle 156 may be defined by a cover sidewall 158. The receptacle 156 may contain a material 160. The material 160 may comprise an emetic (e.g., apomorphine, syrup of ipecac, etc.), a taste deterring additive (e.g., capsaicin, denatium, etc), an unpleasant smelling chemical (e.g., phenyl isonitrate, or other olfactory repellant), a drug antagonist/deactivator, an adhesive, or any combination of the foregoing. In one embodiment, the material 160 may be an adhesive. The adhesive may comprise a two-part epoxy (e.g., an epoxy comprised of the constituents epichlorohydin and bisphenol A). Therefore, there may be provided more than one receptacle 156 such that constituents of the epoxy may be stored in respective/separate receptacles 156 without coming into contact prior to being released from the external cover 150. In an alternate embodiment, a polyurethane material may be provided that cures or hardens once released from the receptacle 156.

The receptacle 156 and the material 160 therein may be isolated from the portion of the interior 116 having the pharmaceutical product 112 by way one or more seals 154. The seal(s) 154 may be associated with or comprise a portion of one or more outlet ports 155. The seal 154 may maintain physical isolation between the receptacle 156 and the portion of the interior 116 having the pharmaceutical product 112 in a first instance or in a first configuration. In this regard, the external cover 150 may be selectively disengaged from the container 110 (e.g., moved to an open position) such that pharmaceutical product 112 may be removed through the opening 118. Therefore, the operation of the pharmaceutical product supply 100 may be similar to that of an ordinary pharmaceutical product container (e.g., pill bottle) such that the external cover 150 may be repetitively selectively disengaged in order to access the contents of the pharmaceutical product supply 100. Because the material 160 may be isolated within the receptacle 156 prior to releasing the material 160, the external cover 150 may be used in accordance with the normal operation of a system for storing a pharmaceutical product that is repetitively accessed.

The receptacle 156 may be interconnected with the portion of the interior 116 having the pharmaceutical product 112 in a second instance or in a second configuration, namely when the seal 154 has been disturbed or disabled (e.g., opened) such that the material 160 associated with the receptacle 156 is released. In one embodiment, released material 114 may flow onto or otherwise contact the pharmaceutical product 112 (e.g., while the external cover 150 is detachably engaged with the container 110; while the external cover 150 is in a closed position). This may be characterized as changing the usability of the pharmaceutical product 112 from a first state or condition to a second state or condition. The first state or condition may be the pharmaceutical product 112 in its prescribed form, prior to being contacted by the released material 114, and accessible through the opening 118 by movement of the external cover 150 relative to the container 110 (e.g., to an open position). The second state or condition may be the pharmaceutical product 112 after being contacted by the released material 114, and which is other than in its prescribed form.

The contacting of the released material 114 with the pharmaceutical product 112 may be characterized as managing the use of the pharmaceutical product 112 in at least some respect, may be characterized as facilitating disposal of the pharmaceutical product 112, or both. For instance, in the case where the released material 114 comprises an adhesive (e.g., an air-curing adhesive or epoxy adhesive), the released material 114 may contact and substantially cover the pharmaceutical product 112. Upon curing or hardening of the released material 114, the pharmaceutical product 112 may become at least substantially encapsulated by the released material 114. This is of course different than its prescribed form, and therefore is an example of the above-noted second condition or state. The released material 114 could also bond to an internal surface of the container 110 at this time as well. This should reduce the potential that the pharmaceutical product 112 can even be removed from the container 110, which is a further example of the above-noted second condition or state. Each such case facilitates the disposal of the pharmaceutical product 112, as it should be in a form that reduces the potential of it being administered or ingested by an individual.

The released material 114 need not encapsulate the pharmaceutical product 112 to provide the above-noted second state or condition. For instance, the material 160 may comprise a taste additive, emetic, or a drug antagonist. Upon the contacting of the released material 114 to the pharmaceutical product 112, the pharmaceutical product 112 may become totally or partially coated by the released material 114. As such, this also provides a change of the usability of the pharmaceutical product 112 to the above-noted second state or condition.

With further reference to FIG. 2, it can be seen that the receptacle 156 may be isolated from the interior 116 in a first instance or in a first configuration by the seal 154. A release mechanism 210 may be provided with the external cover 150. The release mechanism 210 may take a number of forms, and may be triggered in any appropriate manner known in the art (e.g., mechanically or electromechanically). Activation of the release mechanism 210 may disable the seal 154 to allow the material 160 to move out of the receptacle 156 (e.g., where the seal 154 is removed, punctured, cut, torn, popped, melted, opened, broken, ruptured, or the like).

The material 160 may also be contained in what may be referred to as a containment 156 (e.g., a separate structure, for instance in the form of a bladder appropriately integrated with the external cover 150). This may alleviate the need for the above-noted seal(s) 154. In any case, activation of the release mechanism 210 may result in an opening or breaching of the containment 156 such that the contents of the containment 156 may be released from the containment 156. In this regard, releasing of material 160 from the containment 156 may be facilitated by puncturing or rupturing the containment 156, bursting the containment 156, or other means known in the art. Moreover, the containment 156 may contain the material 160 under pressure (which may also be the case if the material 160 is contained directly within the receptacle 156 and is isolated from the pharmaceutical product 112 by the seal 154). That is, the containment 156 may contain the material 160 at a pressure greater than the pressure to which an exterior of the containment 156 is exposed (e.g., a pressure within that part of the interior 116 in which the pharmaceutical product 112 is located or housed). In this regard, upon activation of the release mechanism 210, the material 160 contained within the containment 156 may be forcibly released from the containment 156 (e.g. via a pressure differential). Although the material 160 is shown as being incorporated by the external cover 150, it may be incorporated by the container 110, as well as in combination.

Figure 3:
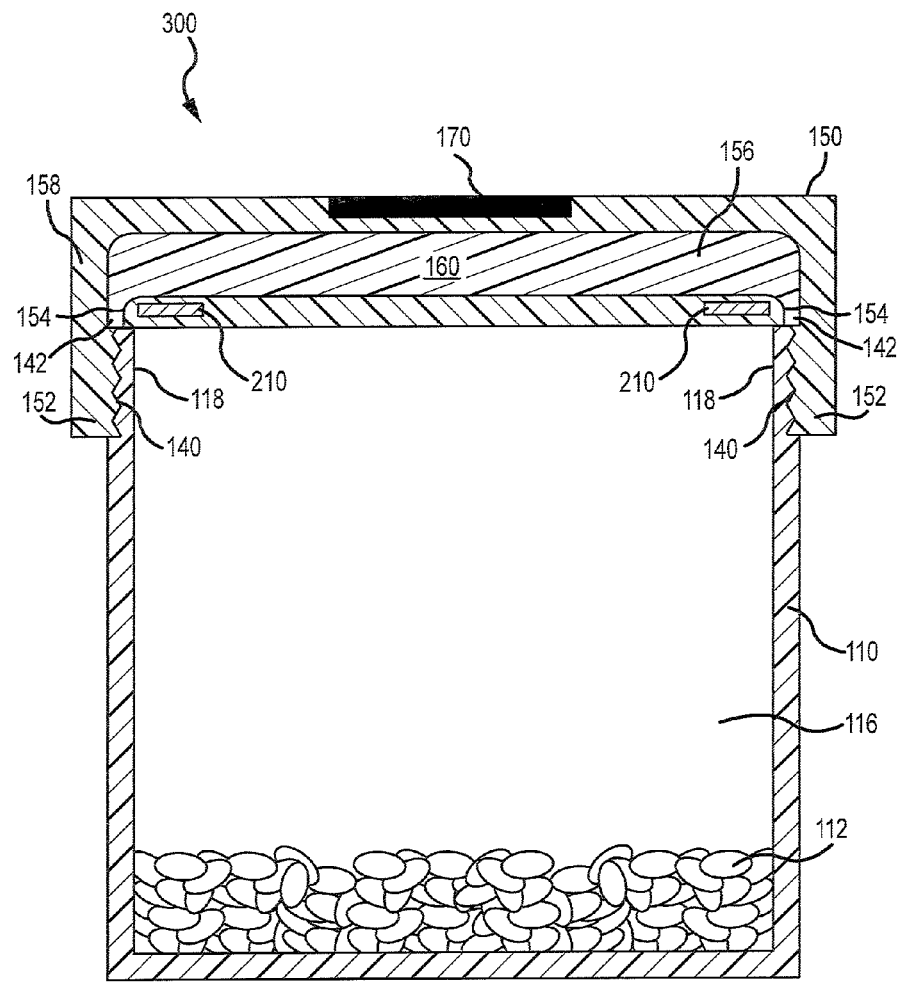
FIG. 3 is a cross-sectional view of another embodiment of a pharmaceutical product supply.

An alternative embodiment of a pharmaceutical product supply 300 is depicted in FIG. 3. In this embodiment, the external cover 150 may be detachably engageable with the container 110 to define an engagement interface 140 between the cover 150 and container 110. For instance, the connector 152 may comprise internal threads and the container 110 (e.g., adjacent to the opening 118) may include external threads such that the connector 152 and container 110 cooperate to define the engagement interface 140 as a threaded interface and as shown in FIG. 3. Alternatively, the engagement interface 140 may be formed by corresponding adjacent portions of the connector 152 and the container 110 in the case of an alternative engagement (e.g., an interference connection, a snap-fit connection, etc.) In any case, the engagement of the connector 152 and the container 110 may provide an engagement interface 140 corresponding to the adjacent portions of the connector 152 and container 110. The interface 140 may include one or more spaces between adjacent portions of the cover 150 and container 110 when the cover 150 is in the closed position (including where the entirety of such an interface 140 is in the form of a small gap between adjacent portions of the cover 150 and container 110).

The pharmaceutical product supply 300 may be used repetitively to access a pharmaceutical product 112 stored in an interior 116 defined by the container 110 and external cover 150 in a first instance or in a first configuration (e.g., prior to activation of one or more release mechanisms 210). Additionally, the pharmaceutical product supply 300 may include one or more outlet ports 142. These outlet ports 142 may be associated with seals 154 that operate to isolate and contain a material 160 within the receptacle 156. Again, if the material 160 is actually contained with a separate containment 156 (e.g., a bladder), the seal(s) 154 could possibly be eliminated. In any case, the outlet ports 142 may be provided adjacent to all of or a portion of the engagement interface 140 such that upon activation of the one or more release mechanisms 210, released material 160 may be directed by way of the outlet ports 142 to the engagement interface 140. For instance, the outlet ports 142 may comprise an annular opening or series of openings adjacent to the connector 152. If the material 160 comprises an adhesive material, the material 160 may contact the connector 152 and container 110 at the engagement interface 140 such that the external cover 150 becomes locked or bonded to the container 110 upon curing or hardening of the material 160. This may be characterized as changing the usability of the pharmaceutical product 112 to the above-noted second state or condition. That is, the external cover 150 may be no longer detachably engaged to the container 110 (e.g., the external cover 150 may no longer be moved to an open position), but is now locked or bonded thereto (e.g., with the external cover 150 in a closed position). This should impede the ability of an individual to gain access to the pharmaceutical product 112 contained therein, which also facilitates disposal of the pharmaceutical product 112 (e.g., while locked in the container 110 by the external cover 150 being fixed thereto).

Additionally, the release mechanisms 210 discussed above with respect to FIGS. 2 and 3 may be operative to function independently of the motion associated with coupling the external cover 150 to or decoupling the external cover 150 from the pharmaceutical product container 110. In this regard, the release mechanism 210 may be provided such that once the external cover 150 is fully coupled to the pharmaceutical product container 110 (i.e., no further relative motion in a direction associated with the coupling is available), the release mechanism 210 may be activated. In this regard, the action of the release mechanism 210 may be completely divorced from the action of the coupling and uncoupling of the external cover 150 such that the release mechanism 210 operates wholly independently of the coupling and decoupling of the external cover 150 with respect to the pharmaceutical product container 110.

Figure 4:
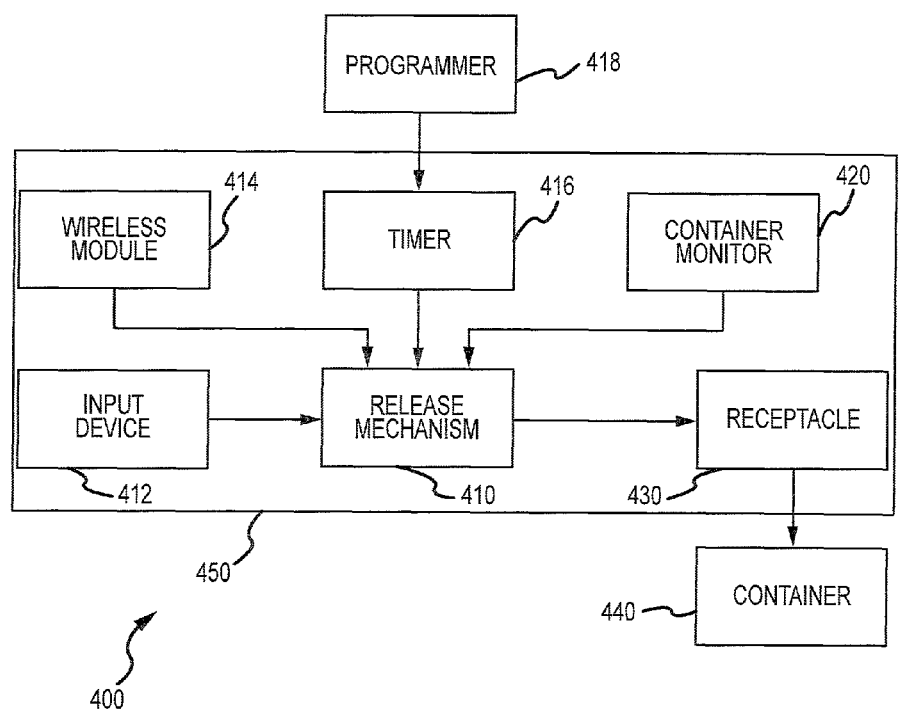
FIG. 4 is a schematic view of an embodiment of a pharmaceutical product supply.

Turning now to FIG. 4, a schematic view of an embodiment of a pharmaceutical product supply 400 for controlling access to a pharmaceutical product stored in a container is shown. The system 400 may include a release mechanism 410. For instance, the release mechanism 410 may correspond to release mechanisms 210 shown and described in relation to FIG. 2 or 3. The release mechanism 410 may be in communication with a receptacle 430 in order to selectively release a material from the receptacle 430. The receptacle 430 could be in the form of a pocket with one or more outlet ports and associated seals, could be in the form of a separate containment (e.g. a bladder), could be in the form of an enclosed space, or any combination thereof. Upon release, the material may change the usability of the pharmaceutical product from the above-noted first state or condition to the above noted second state or condition (e.g., by flowing into the container 440, by contacting the container 440 to lock or bond the external cover 450 thereto in a closed position, or both).

The release mechanism 410 may be in communication with a container monitor 420. The container monitor 420 may comprise a sensor (e.g., mechanical sensor, optical sensor, etc.) provided with the external cover 450. The container monitor 420 may be operative to sense the engagement (e.g., closed position) and/or detachment (e.g., open position) of the external cover 450 with respect to a container 440, and in turn communicate the status of the external cover 450 (e.g., engaged/detached) with respect to the container 440. For instance, it may be such that the release mechanism 410 is armed only when the external cover 450 interacts with the container 440 in an engaged arrangement (e.g., in a closed position), such that an interior or enclosed space is defined by the container 440 and the external cover 450. Otherwise, if the external cover 450 is removed from or is otherwise opened to gain access to the interior of the container 440 (e.g., when a pharmaceutical product is being removed from the container 440 by a user; with the external cover 450 in an open position), the container monitor 420 may be operative to sense the detachment and the release mechanism 410 may be disabled such the release of material from the receptacle 430 is prevented while the external cover 450 is detached from the container 420.

The release mechanism 410 may be in communication with and responsive to a number of means for activation of the release mechanism 410. It will be understood that the means described below may be used in various combinations, such that the release mechanism 410 may be responsive to more than one activation trigger. It will be further understood that regardless of the operation of the release mechanism (e.g., mechanical, electromechanical, etc.), any of the means for activating the release mechanism 410 described below may be employed. Some means presented herein require action on the part of a user. These user-activated triggering means are generally referred to as manual means of activation. Other means presented herein do not require an active input on the part of a user, but rather are responsive to logic or other automatic means of activation. In any regard, manual and automatic activation means may be used in conjunction or independently.

The release mechanism 410 may be in communication with a timer 416, which may be preset. The release mechanism 410 may be responsive to the timer 416 such that upon expiration of the timer 416, the release mechanism 410 is activated. The timer 416 may start to run upon the first sensing of engagement of the external cover 450 with a container 440

(e.g., as determined using the container monitor 420). As such, upon first engagement of the external cover 450 with a container 440 (e.g., a movement to a closed position), the timer 416 may begin to run such that a time period begins to count down. The timer 416 may be a programmable timer such that a programmer 418 is used to selectively program a time period of the timer 416. Another option is to provide a plurality of external covers 450 comprising one or more groups having different preset timer values.

Figure 5C:
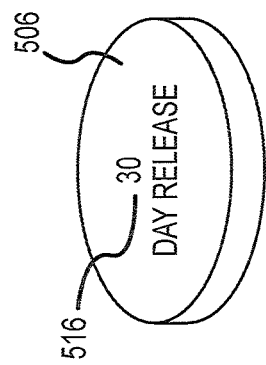
FIGS. 5A-C are perspective views of embodiments of external pharmaceutical product container covers or lids.
Figure 5B:
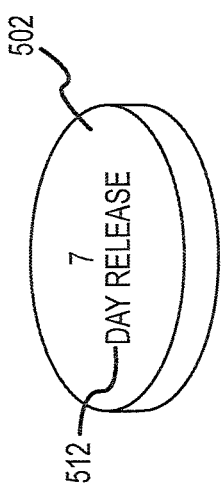
Figure 5A:
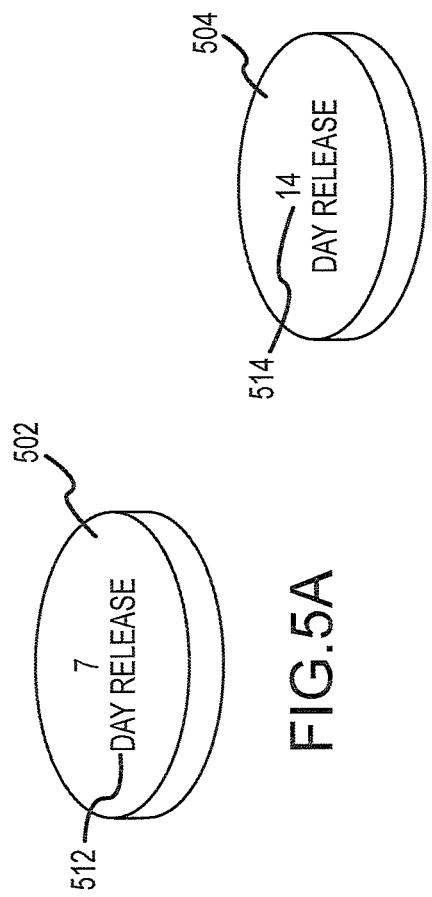

As noted and now with additional reference to FIGS. 5A-C, external cover 450 may correspond to any of external covers (502, 504, 506) and may include timers with different time periods. Indicia (512, 514, 516) may be provided on each respective external cover to indicate the duration of the preset timer for a particular external cover. In this regard, external cover 502 may include a 7-day preset timer, external cover 504 may include a 14-day preset timer, and external cover 506 may include a 30-day preset timer. Accordingly, the external covers (502, 504, 506) may include corresponding indicia (512, 514, 516) indicative of the period of the preset timer for the respective external cover. External cover 502 may bear indicia 512 indicating a 7-day release period, external cover 504 may bear indicia 514 indicating a 14-day release period, and external cover 506 may bear indicia 516 indicating a 30-day release period. The indicia (512, 514, 516) may be arranged such that when the external cover (502, 504, 506) is engaged with an appropriate pharmaceutical product container, the indicia (512, 514, 516) are visible on the exterior of the external cover (502, 504, 506) or pharmaceutical product supply. Other periods of time may be provided for the preset timer and the examples provided above are exemplary and not intended to limit the periods that may be provided to those used herein.

A process employing groups of preset external covers may be employed. For example, a pharmacist when filling a prescription may determine the length of time allowed for the prescription to be taken (e.g., a 10-day supply of pharmaceutical product) and may select an appropriate external cover corresponding to the length of time required for the prescription to be administered. Additionally, a grace period may be provided such that the selected external cover includes a timer that is slightly longer than the actual time required for the prescription to be administered. For instance, in the case of a 10-day prescription (that is a prescription wherein enough pharmaceutical product has been prescribed by a physician to last 10 days), a 14-day release external cover 504 may be selected from the groups of external covers by the pharmacist using indicia 514 to select the appropriate external cover.

Upon first engagement of the appropriately selected external cover 504 to a container, a timer may begin to run. After the 10-day allowable prescription period, pharmaceutical product may be remaining that is stored within the container. After 14 days (e.g., allowing a 4 day grace period in the example), the timer may activate a release mechanism, such that if a container monitor provided with the external cover indicates the external cover is engaged with a container, the release mechanism may be activated in order to release material from a receptacle to thereafter control access to the remaining pharmaceutical product.

A similar process may also be carried out using a programmable timer. In this instance, a pharmacist may employ an external cover comprising a programmable timer. Again referencing FIG. 4, the external cover 450 may be connected to a programmer 418 for programming the timer 416. The external cover 450 may be connected to the programmer 418 by a wired or physical connection, or the external cover 450 may communicate with the programmer 418 wirelessly. In this regard, a pharmacist may program an external cover with an appropriate time period corresponding to the duration of a prescription. For instance, the duration of a prescription may correspond to a 30-day supply of pharmaceutical product. In this regard, the pharmacist may choose to program the timer 416 to a 35-day period. In this regard, five additional grace period days may be allowed. Alternatively, the timer 416 could be programmed for a 30-day period, such that the release occurs at the conclusion of the prescription period. In one embodiment, the release time may be preprogrammed based on the prescription loaded into the pharmacy system, thus reducing the potential for human error. At the conclusion of the programmed period, the timer 416 may activate the release mechanism 410 such that, if the container monitor 420 indicates the external cover 450 is engaged with a container 440, the release mechanism 410 may be activated to release the releasable material. The timer 416 could also be programmed when the external cover 450 (alone or when positioned on the container 440) are positioned on a base station.

Alternatively or additionally, a wireless module 414 may be provided in communication with the release mechanism 410. The wireless module 414 may be operative to receive a signal indicating a release command. Upon receipt of a release command, the wireless module 414 may communicate with the release mechanism 410 such that the release mechanism 410 is activated and material may be released from the receptacle 430. The wireless module 414 may employ any wireless technology, such as radio frequency, infrared, Bluetooth, etc. It will be understood that the wireless module 414 may be operative to receive a network communication. In this regard, the wireless module 414 may be operative to communicate via a network (e.g., a wide area network, a local area network, a cellular network, etc.). A user (e.g., a physician, pharmacist, or patient) may employ a remote means to generate and send a release command in order to activate the release mechanism 410.

The wireless module 414 could also be used to access or modify other components of the external cover 450. For instance, the wireless module 414 may be operative to reprogram or modify a programmed timer that has been previously set. This may involve shortening or extending the time period of the programmed timer. One example of the wireless module 414 being used in this manner may involve a physician modifying the prescribed trigger date based on discussions with the patient.

Figure 6:
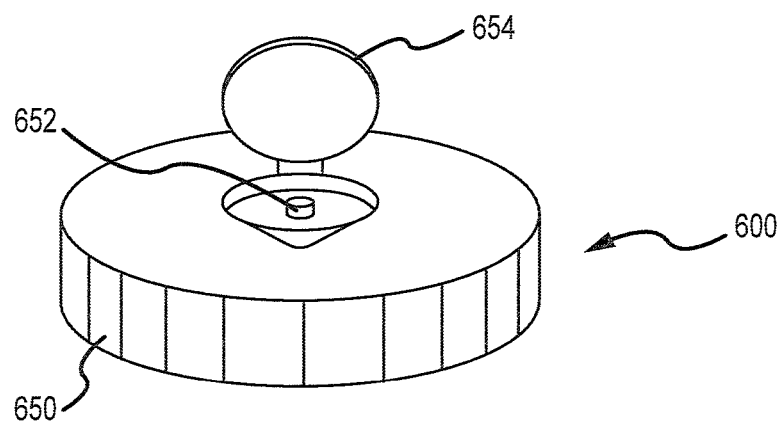
FIG. 6 is a perspective view of an embodiment of a triggering device for a pharmaceutical product supply.

Additionally, an input device 412 may be provided in communication with the release mechanism 410 such that the input device 412 is capable of allowing for manual activation of the release mechanism 410 to release a material from the receptacle 430. The input device 412 may include a button, switch, or other input device and may be provided with the external cover 450. For instance, one embodiment of an input device 412 for activating the release mechanism 410 is shown in FIG. 6. The external cover 600 may include a push button 652. The push button 652 may be partially or fully obscured by a guard or outer cap 654 when not in operation. The guard 654 may reduce the potential of accidental actuation of the push button 652, and thus accidental release of material. In any case, the release mechanism 410 may respond to the push button 652 such that a material may be released from the receptacle 430 upon actuating the button 652.

Moreover, the release mechanism 410 may be responsive to an event trigger. For instance, the container monitor 420 may monitor the number of times or frequency at which the container 440 has been accessed by the user as indicated by the cover 450 being removed from the container 440 (e.g., moved to an open position). If the container 440 is opened too many times in a defined period (e.g., indicating overuse) the release mechanism 410 may be activated. Additionally, if the container 440 is not accessed for a given period of time or too infrequently during a given period of time (e.g., indicating underuse or nonuse), the release mechanism 410 may be activated.

Figure 7:
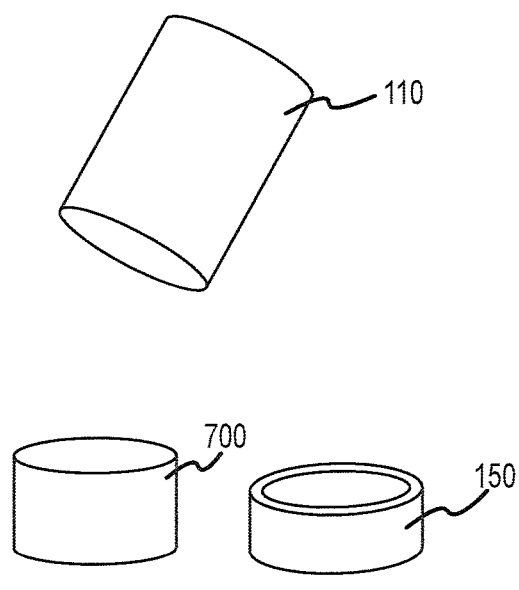
FIG. 7 is a perspective view of an embodiment of a pharmaceutical product supply, wherein the pharmaceutical product has been encapsulated.

As stated above, in one embodiment the released material may be a two-part epoxy or other adhesive (e.g., an air-curing adhesive). In this regard, upon release of the material, the material may contact a pharmaceutical product such that the pharmaceutical product is contacted by and substantially encapsulated within the material. An example of this can be seen in FIG. 7, wherein a block 700 comprising adhesive material and pharmaceutical product has been removed from a container 110. The pharmaceutical product in this instance is encapsulated in the block 700. This may be characterized as changing the usability of the pharmaceutical product to the above-noted second state or condition. If the adhesive is non-digestible and coats the pharmaceutical product, any ingestion of the pharmaceutical product may result in the pharmaceutical product simply passing through the digestive track of a would-be user without being absorbed or digested by the user.

It will further be understood that alternative or additional releasable materials may be provided to change the usability of a pharmaceutical product to a second state or condition. For instance a drug antagonist may be used such that any active ingredient of the pharmaceutical product is neutralized. In this regard, even if indigested or otherwise administered, the pharmaceutical product would not take effect in that it may have been neutralized by the drug antagonist.

Returning to FIGS. 2 and 3, the pharmaceutical product supplies (100, 300) may also include an alert 170. The alert 170 may be used to provide an indication of the remaining time before the activation of the release mechanism 210. In this regard, the alert 170 may provide an indication as to when the release mechanism 210 will be activated. The alert 170 may comprise a visual display (e.g., a LCD display, an LED display, etc.) provided on a lid indicating the remaining time period before activation of the release mechanism 210 will occur. Alternatively, the alert 170 may comprise an audible alert that may sound prior to activation of the release mechanism. For instance, the audible alert may sound every 15 minutes for the 24 hours leading up to activation of the release mechanism 210. The audio alert may alternatively or additionally comprise a tone or series of tones or other audible signals that indicate imminent release of the neutralizing agent.

Figure 8:
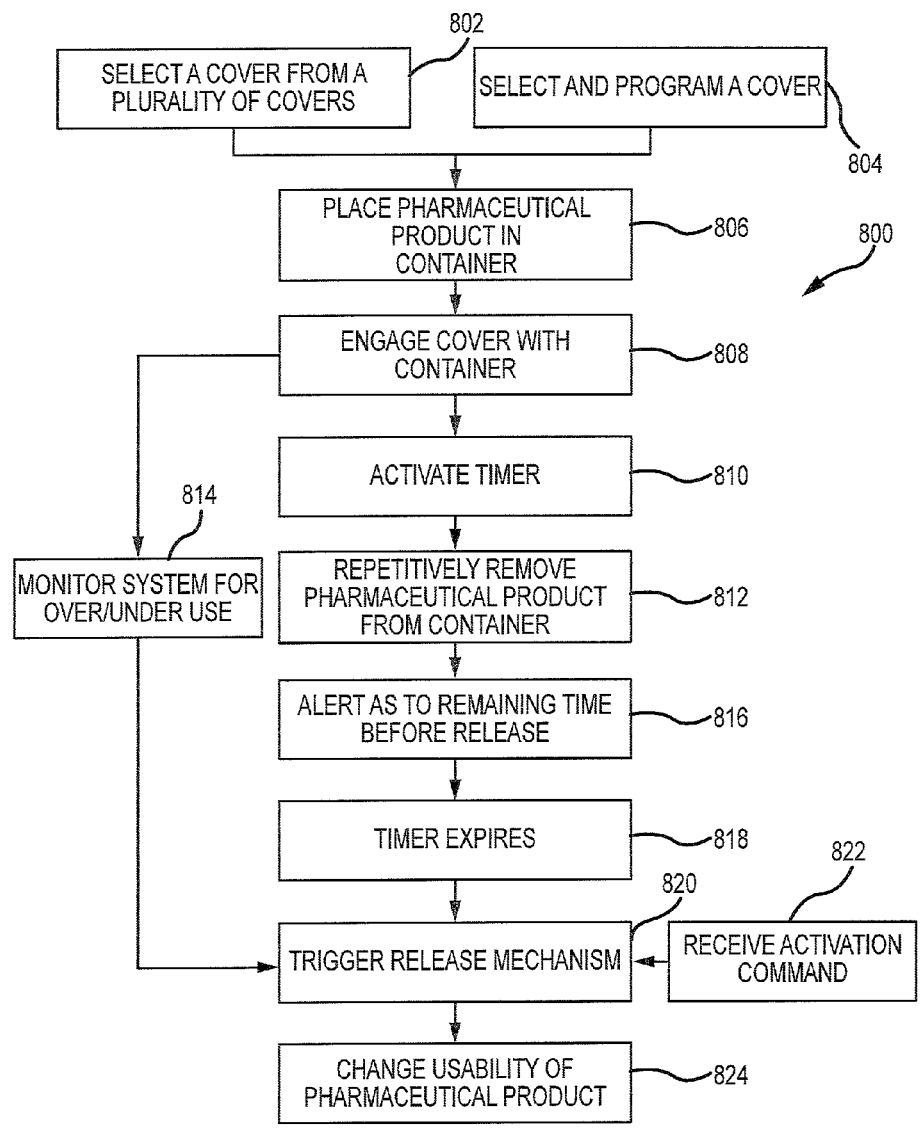
FIG. 8 is a flowchart of an embodiment of a method for managing the use of a pharmaceutical product.

Referring now to FIG. 8, a protocol 800 for managing the use of pharmaceutical product is disclosed. The protocol 800 may initiate by either selecting 802 an external cover from a plurality of external covers that have preset timers or by selecting and programming 804 an external cover. In either instance, the selection 802 or programming 804 of the external cover or timer may correspond to an allowable prescription period. Next, pharmaceutical product may be placed 806 in a container.

The protocol 800 may include engaging 808 the external cover with the container (e.g., detachably; moving the external cover to a closed position). Upon the engaging 808, the pharmaceutical product placed 806 in the container may be substantially isolated from the surroundings. Engaging 808 the external cover may also result in a timer being activated 810. For instance, the external cover may include a container monitor that detects when the external cover has engaged 808 the container (e.g., detects when the external cover has moved to a closed position). Upon such detection, the timer may be activated 810.

Additionally, once the external cover has engaged 808 the container, the protocol 800 may include monitoring 814 the supply for under or over use. For example, if at any time during the protocol 800 the external cover has been removed too often or too frequently from the container, the protocol 800 may include triggering 820 a release mechanism as will be discussed further below. Alternatively or additionally, the monitoring 814 may include determining if the container is being accessed too infrequently or not at all. Accordingly, if such under use is detected during the monitoring 814, the release mechanism could also be triggered 820.

However, the protocol 800 may also involve repetitively removing 812 pharmaceutical product from the container according to a physician's instructions or prescription. The removing 812 of pharmaceutical product may include respectively detaching the external cover from the container to access a pharmaceutical product stored in the container (e.g., a movement of the external cover to an open position). This may continue until the protocol 800 alerts 816 that the activated timer from 810 will soon expire. At that time, the alerting 816 may include displaying a visual indicator or sounding an auditory alert. Moreover, a communication could be directed wirelessly to an individual in the form of a text message, e-mail, telephone call, or other appropriate communication.

The protocol 800 may proceed such that the timer expires 818. The expiration 818 of the timer may result in the triggering 820 of the release mechanism. Alternatively, a release command may be received 822 at any time during the protocol 800, which would also result in triggering 820 of the release mechanism upon the receiving 822. In this regard, there may be time left on the timer such that the timer has yet to expire 818 when the release mechanism is triggered 820. The triggering 820 of the release mechanism may also include scrutinizing a sensor or detector to determine if the external cover is engaged with the container (e.g., to determine if the external cover is in a closed position). In one embodiment, the triggering 820 does not occur until the external cover is engaged with a container (e.g., in a closed position) to prevent the release of a material into an undesired environment.

Upon triggering 820 of the release mechanism, material may be released such that the usability of the pharmaceutical product is changed from a first state or condition (e.g., a prescribed form; accessible from the container in its prescribed form) to a second state or condition 824. As discussed above, this changing of the usability of the pharmaceutical product 824 may be by way of contacting the pharmaceutical product with the material, may be by way of fixing the external cover the container (e.g. via bonding) such that removal is made difficult or highly unlikely, or both.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A pharmaceutical product supply, comprising:
   a container comprising a sidewall, an end wall, and an open end, wherein said end wall and said open end are oppositely disposed, wherein a boundary of a first space is defined by said sidewall and said end wall, and wherein said open end leads into said first space;
   an external cover comprising a receptacle, an outlet port from said receptacle, and a seal blocking said outlet port;
   pharmaceutical product disposed within said first space of said container, wherein said external cover blocks said open end and encloses said pharmaceutical product within said container when said external cover is detachably engaged with said container;
   a first material within said receptacle of said external cover;
   a release mechanism, wherein activation of said release mechanism is independent of movement of said external cover relative to said container;
   a first configuration where said receptacle of said external cover is isolated from said pharmaceutical product within said first space of said container such that said first material is also isolated from said pharmaceutical product within said first space of said container and such that said first material is confined within said receptacle, wherein said pharmaceutical product supply is in said first configuration prior to said activation of said release mechanism; and
   a second configuration where said receptacle of said external cover is interconnected said first space of said container such that there is a passage from said receptacle, through said outlet port, though said open end, and into said first space, and such that said first material is released from said receptacle of said external cover, passes through said outlet port, passes through said open end of said container, and comes into contact with said pharmaceutical product within said first space of said container, wherein said second configuration is achieved by said activation of said release mechanism to disable said seal.

2. The pharmaceutical product supply of claim 1, wherein said release mechanism is activatable to release said first material from a confined condition.

3. The pharmaceutical product supply of claim 1, further comprising:
   a containment disposed within said receptacle, wherein said first material is disposed within said containment.

4. The pharmaceutical product supply of claim 3, wherein said containment is at a pressure greater than a pressure in a portion of said first space containing said pharmaceutical product.

5. The pharmaceutical product supply of claim 1, wherein said first material is selected from the group consisting of an emetic, a taste deterrent, an adhesive, an epoxy, an olfactory repellent, a drug antagonist, or any combination thereof.

6. The pharmaceutical product supply of claim 1, wherein said release mechanism is responsive to a signal to dispose said first material in a released state.

7. The pharmaceutical product supply of claim 1, wherein said release mechanism is activatable in response to a timer.

8. The pharmaceutical product supply of claim 1, wherein said release mechanism is manually activatable on an exterior of said pharmaceutical product supply.

9. The pharmaceutical product supply of claim 8, wherein said release mechanism is accessible through an external cap.

10. The pharmaceutical product supply of claim 1, wherein said release mechanism is activatable in response to a predetermined event, wherein said predetermined event comprises at least one of:
    exceeding a predetermined number of detachments of said external cover from said container over a predetermined time period; and
    a predetermined time period elapsing without an occurrence of a predetermined number of detachments of said external cover from said container.

11. The pharmaceutical product supply of claim 1, further comprising:
    a sensor operative to determine if said external cover is engaged with said container, wherein said release mechanism is activatable when said external cover is engaged with said container and is not activatable when said external cover is not engaged with said container.

12. The pharmaceutical product supply of claim 1, further comprising:
    an alert indicative of a remaining time period prior to activation of said release mechanism.

13. A pharmaceutical product supply system, comprising:
    the pharmaceutical product supply of claim 1; and
    a remotely located trigger, wherein said release mechanism is activatable in response to said remotely located trigger.

14. A pharmaceutical product supply system, comprising:
    the pharmaceutical product supply of claim 1; and
    a plurality of selectable external covers that are detachably engageable with said container, wherein a first group of said plurality of selectable external covers is associated with a first timed release of said first material, wherein a second group of said plurality of external covers is associated with a second timed release of said first material that is different from said first timed release, and wherein said external cover is selected from said plurality of selectable external covers.

15. The pharmaceutical product supply system of claim 14, wherein said first group of said plurality of selectable external covers bear corresponding first indicia indicative of said first timed release and said second group of said plurality of selectable external covers bear corresponding second indicia indicative of said second timed release.

* * * * *